United States Patent
Zakaria et al.

(10) Patent No.: US 12,332,419 B2
(45) Date of Patent: Jun. 17, 2025

(54) IMAGING DEVICE WITH A PHOTONIC INTEGRATED CIRCUIT

(71) Applicant: Honeywell International Inc., Charlotte, NC (US)

(72) Inventors: Ryadh Abdullah Zakaria, Waterlooville (GB); Chad William Hoyt, Roseville, CA (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 111 days.

(21) Appl. No.: 18/460,328

(22) Filed: Sep. 1, 2023

(65) Prior Publication Data
US 2025/0076629 A1    Mar. 6, 2025

(51) Int. Cl.
*G02B 21/36* (2006.01)
*G02B 21/00* (2006.01)
*G02B 21/06* (2006.01)
*G03H 1/00* (2006.01)

(52) U.S. Cl.
CPC ....... *G02B 21/361* (2013.01); *G02B 21/0064* (2013.01); *G02B 21/0068* (2013.01); *G02B 21/06* (2013.01); *G03H 1/0005* (2013.01); *G03H 2001/005* (2013.01)

(58) Field of Classification Search
CPC .............. G02B 21/361; G02B 21/0064; G02B 21/0068; G02B 21/06; G03H 1/0005; G03H 2001/005
USPC .......................................................... 348/79
See application file for complete search history.

(56) References Cited

U.S. PATENT DOCUMENTS

| | | | | |
|---|---|---|---|---|
| 7,184,622 B2 * | 2/2007 | Uhlhorn | ............... | G02B 6/4249 385/24 |
| 10,859,976 B2 * | 12/2020 | Lin | ....... | G03H 1/0443 |
| 2013/0278982 A1 * | 10/2013 | Huys | .................... | G03H 1/0465 359/22 |
| 2014/0376001 A1 | 12/2014 | Swanson | | |
| 2016/0131882 A1 * | 5/2016 | Wallace | ............... | G02B 21/008 356/458 |
| 2017/0299371 A1 * | 10/2017 | Cotte | ................... | G03H 1/0866 |
| 2018/0011443 A1 * | 1/2018 | Stahl | .................... | G03H 1/0465 |
| 2018/0365810 A1 * | 12/2018 | Khare | .................. | G03H 1/0866 |

(Continued)

FOREIGN PATENT DOCUMENTS

| CN | 104459971 A | | 3/2015 | |
|---|---|---|---|---|
| JP | 2013228736 A | * | 11/2013 | ........... G03H 1/0402 |

OTHER PUBLICATIONS

Perrin et al., Low-coherence off-axis digital holographic microscopy, ARXIV ID: 2111.00815 (Year: 2021).*

(Continued)

*Primary Examiner* — Marnie A Matt
(74) *Attorney, Agent, or Firm* — Alston & Bird LLP

(57) ABSTRACT

A digital holographic microscope that includes a light source and a photonic integrated circuit. The photonic integrated circuit can include a branching waveguide optically coupled to the light source, and a multi-angle illumination device optically coupled to the branching waveguide. In various examples, the multi-angle illumination device includes an optical phased array that includes a plurality of light emitters. In various examples, the multi-angle illumination device includes a grating coupler.

20 Claims, 6 Drawing Sheets

(56) References Cited

U.S. PATENT DOCUMENTS

2019/0339327 A1* 11/2019 Huebner .......... G01R 31/31728
2021/0199942 A1*  7/2021 Siebenmorgen ..... G02B 21/367
2022/0137288 A1   5/2022 Swanson

OTHER PUBLICATIONS

Picazo-Bueno et al., Off-Axis Digital Lensless Holographic Microscopy, Journal of Biomedical Optics, 29 (Suppl 2), S22715 (Year: 2024).*

Sung-Moon Kim et al., "Compact solid-state optical phased array beam scanners based on polymeric photonic integrated circuits," Scientific Reports, Nature Portfolio, 11:1-9, (2021).

* cited by examiner

IMAGING DEVICE WITH A PHOTONIC INTEGRATED CIRCUIT

TECHNICAL FIELD

The present application relates generally to an imaging device with a photonic integrated circuit. More specifically, the present invention relates to an imaging device, such as a digital holographic microscope, that includes a photonic integrated circuit that has a multi-angle illumination device.

BACKGROUND

Digital holographic microscopy methods include digitally recording light wave front information originating from an object as a hologram. The hologram can be converted into an image of the object by numerical reconstruction algorithms. Existing technologies may only illuminate the object to be imaged at a single angle to create only one hologram that is converted into the image. For some applications, the resulting image from these existing technologies may be too low. As such, a method and apparatus to illuminate the object at multiple angles to create multiple holograms to reconstruct into a high resolution image would be welcomed in the art.

Additionally, existing technologies may only have the ability to illuminate the object to be imaged with light that has a specific, pre-defined wavelength. However, as will be appreciated, different objects to be imaged may require a different wavelength of light to produce a clear image. For example, larger objects, such as pollen, may require a greater wavelength than smaller objects, such as red blood cells. As such, a method and apparatus to image various sized objects with light that has a wavelength that is tuned for the object to be imaged would be welcomed in the art.

Also, existing technologies may not have the ability to adjust the resolution of an image captured by a digital holographic microscope. For example, in some applications, it may be acceptable or desirable to image an object with a normal level of resolution. However, in other applications, it may be necessary or desirable to image an object with a resolution that is higher than the normal level of resolution. Existing technologies may not have the ability to switch from the normal level of resolution to the resolution that is higher than the normal level of resolution, and vice-versa. As such, a method and apparatus that allows the imaging of various-sized objects at multiple resolutions that are tuned for those objects would be welcomed in the art.

The inventors have identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems and apparatuses to provide for improved imaging devices.

In various aspects, a digital holographic microscope includes a light source and a photonic integrated circuit. The photonic integrated circuit can include a branching waveguide optically coupled to the light source, and a multi-angle illumination device optically coupled to the branching waveguide.

In various examples, the multi-angle illumination device includes an optical phased array that includes a plurality of light emitters.

In various examples, the branching waveguide includes a plurality of terminal branches that are each optically coupled to a corresponding light emitter of the plurality of light emitters.

In various examples, the photonic integrated circuit includes a phase modulator. The phase modulator can be configured to change a phase of light passing through the branching waveguide.

In various examples, the phase modulator is configured to change an angle of a superposed light beam emitted from the multi-angle illumination device.

In various examples, the light source is a wavelength sweeping laser or a wavelength tuning laser.

In various examples, the light source is configured to emit light at a plurality of different wavelengths.

In various examples, the digital holographic microscope further includes an imager.

In various examples, the imager is a charge-coupled device (CCD) sensor.

In various examples, the multi-angle illumination device includes a grating coupler.

In various examples, the multi-angle illumination device includes a planar lens.

In various examples, the branching waveguide includes a plurality of terminal branches. The photonic integrated circuit can include a light switching network configured to prevent light from passing through at least one of the plurality of terminal branches.

In various examples, the digital holographic microscope is configured to operate in a first mode and in a second mode. When the digital holographic microscope is operating in the first mode, the multi-angle illumination device can illuminate an object to be imaged at a first number of angles. When the digital holographic microscope is operating in the second mode, the multi-angle illumination device can illuminate an object to be imaged at a second number of angles. The second number of angles is greater than the first number of angles.

In various aspects, a method of creating a digital holographic image includes (i) splitting a light beam into a plurality of light beams, (ii) shifting a phase of at least one of the plurality of light beams, (iii) combining the plurality of light beams to create a superposed light beam, (iv) illuminating an object to be imaged with the superposed light beam, and (v) receiving the superposed light beam with an imager.

In various examples, the method further includes repeating steps (i) through (v) at least one time.

In various examples, the method further includes repeating steps (i) through (v) at least four times.

In various examples, the method further includes processing data from the imager to create the digital holographic image.

In various aspects, a method of creating a digital holographic image includes (i) splitting a light beam into a plurality of light beams, (ii) refracting only one of the plurality of light beams through a lens, (iii) guiding the refracted beam to a grating coupler,
  (iv) illuminating an object to be imaged with the light emitted by the grating coupler, and (v) receiving the light emitted by the grating coupler with an imager.

In various examples, the method further includes repeating steps (i) through (v) at least one time.

In various examples, the method further includes repeating steps (i) through (v) at least four times.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
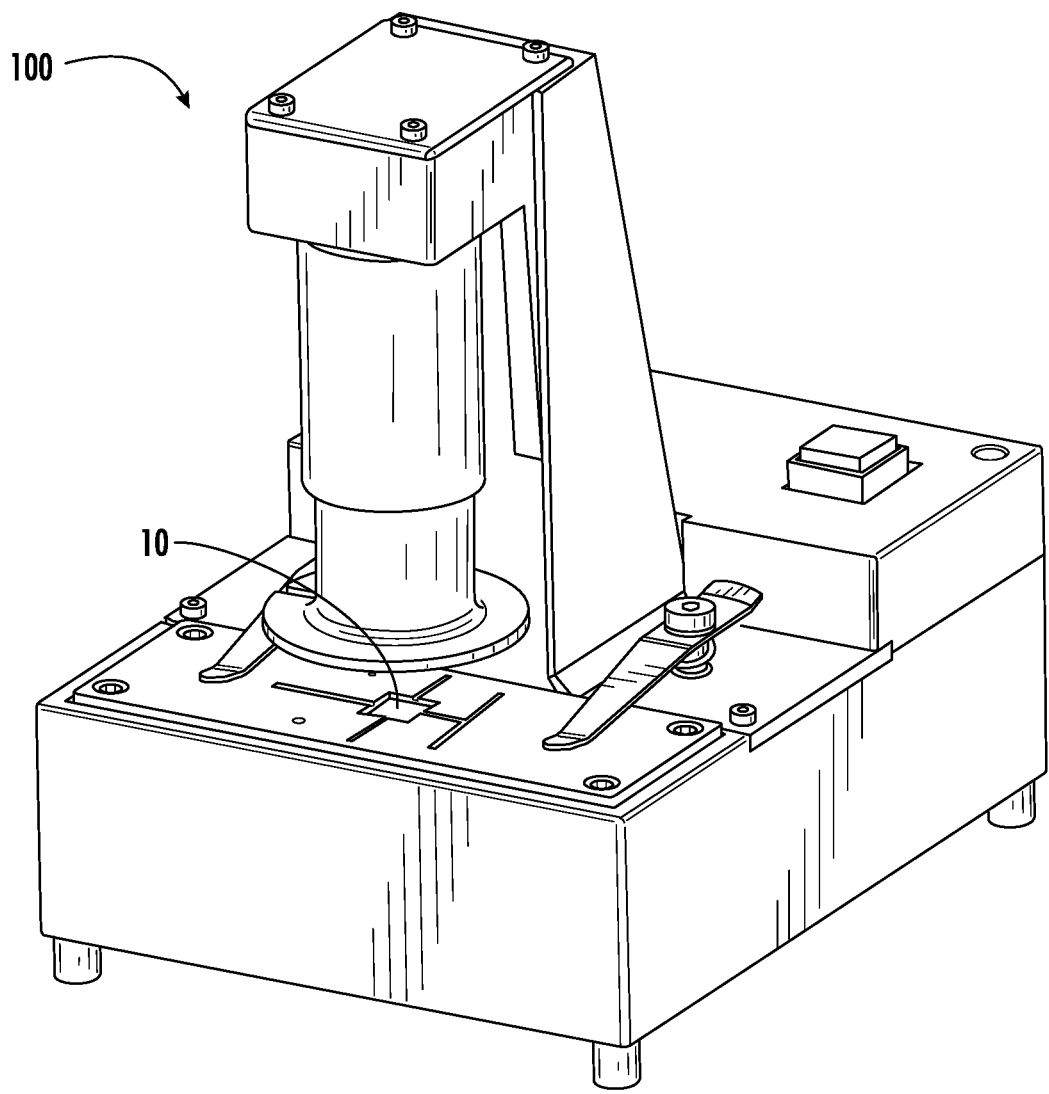

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a perspective view of an imaging device, in accordance with an example embodiment.

Figure 2:
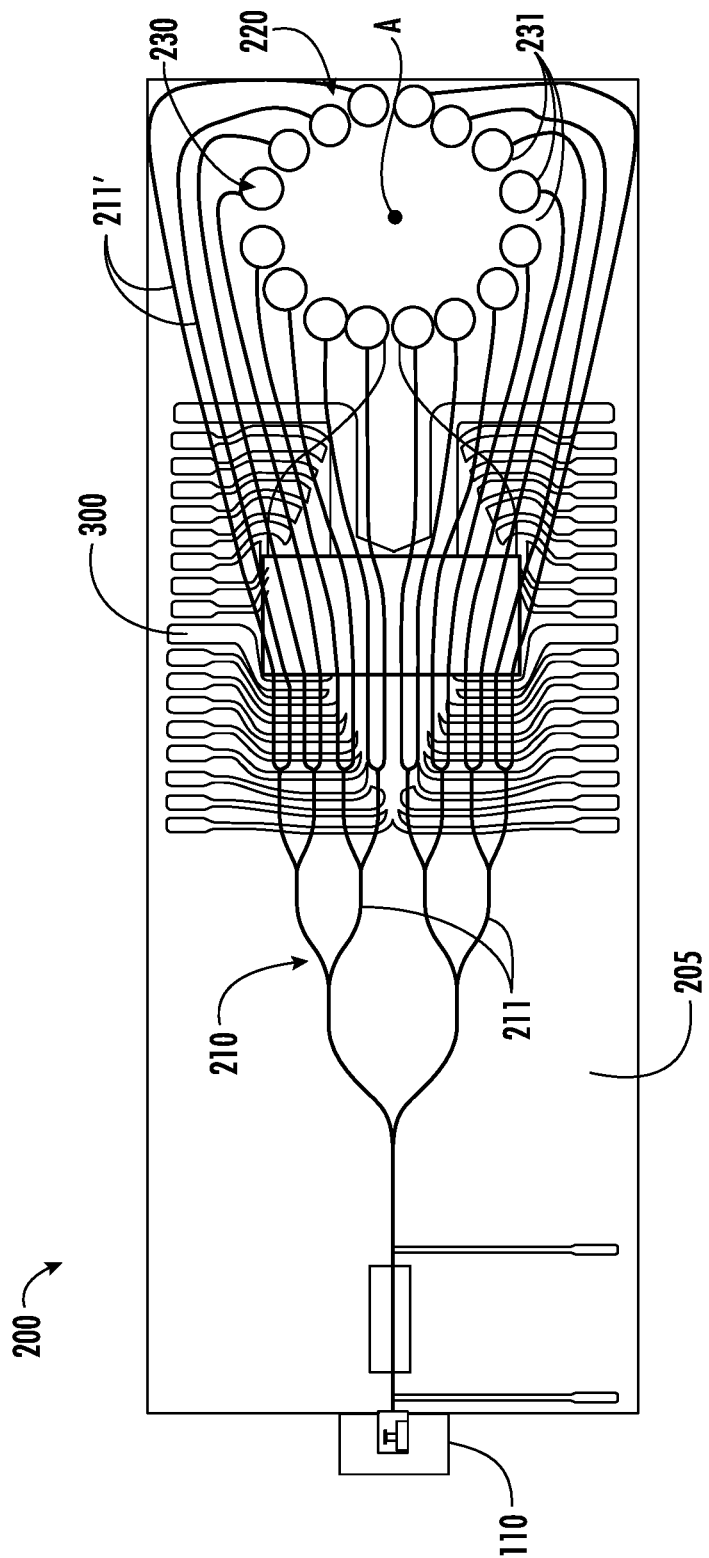

FIG. 2 provides a schematic, top view of a photonic integrated circuit, in accordance with an example embodiment.

Figure 3:
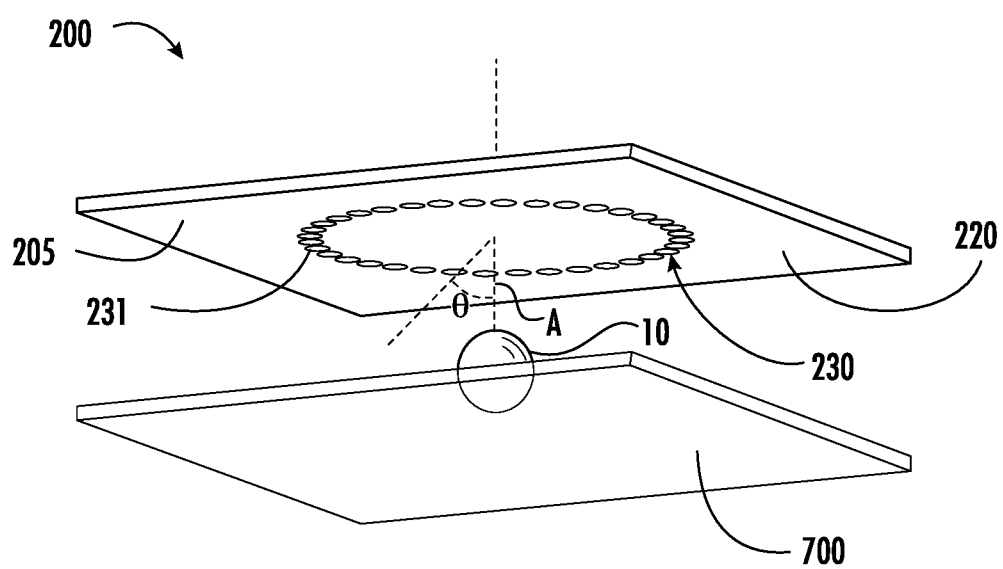

FIG. 3 provides a schematic, perspective view of a portion of an imaging device with the photonic integrated circuit of FIG. 2.

Figure 4:
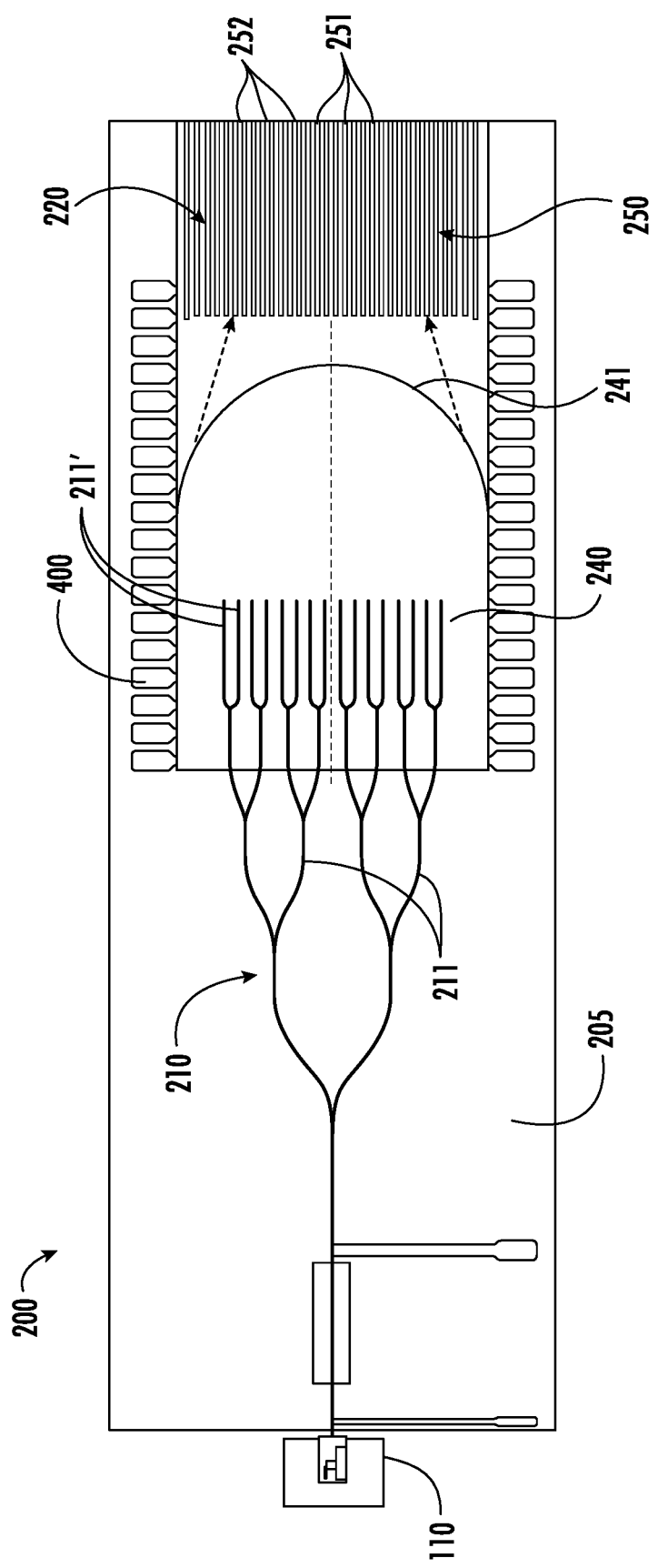

FIG. 4 provides a schematic, top view of a photonic integrated circuit, in accordance with an example embodiment.

Figure 5:
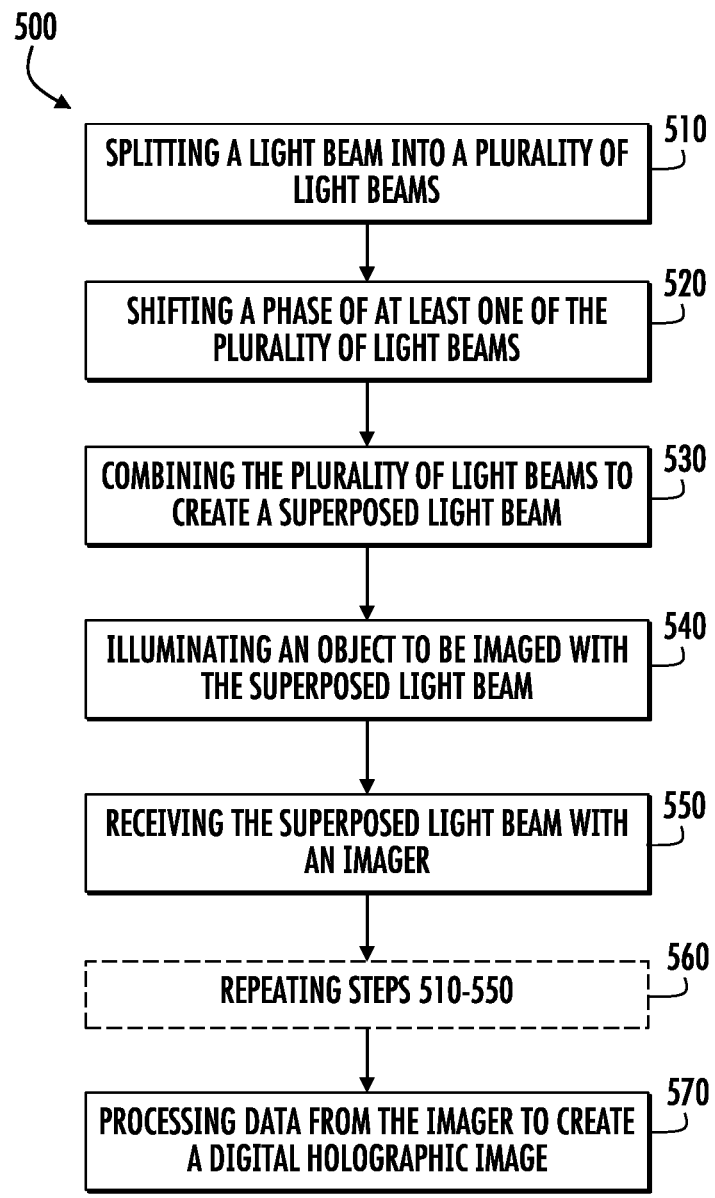

FIG. 5 provides a method of creating a digital holographic image.

Figure 6:
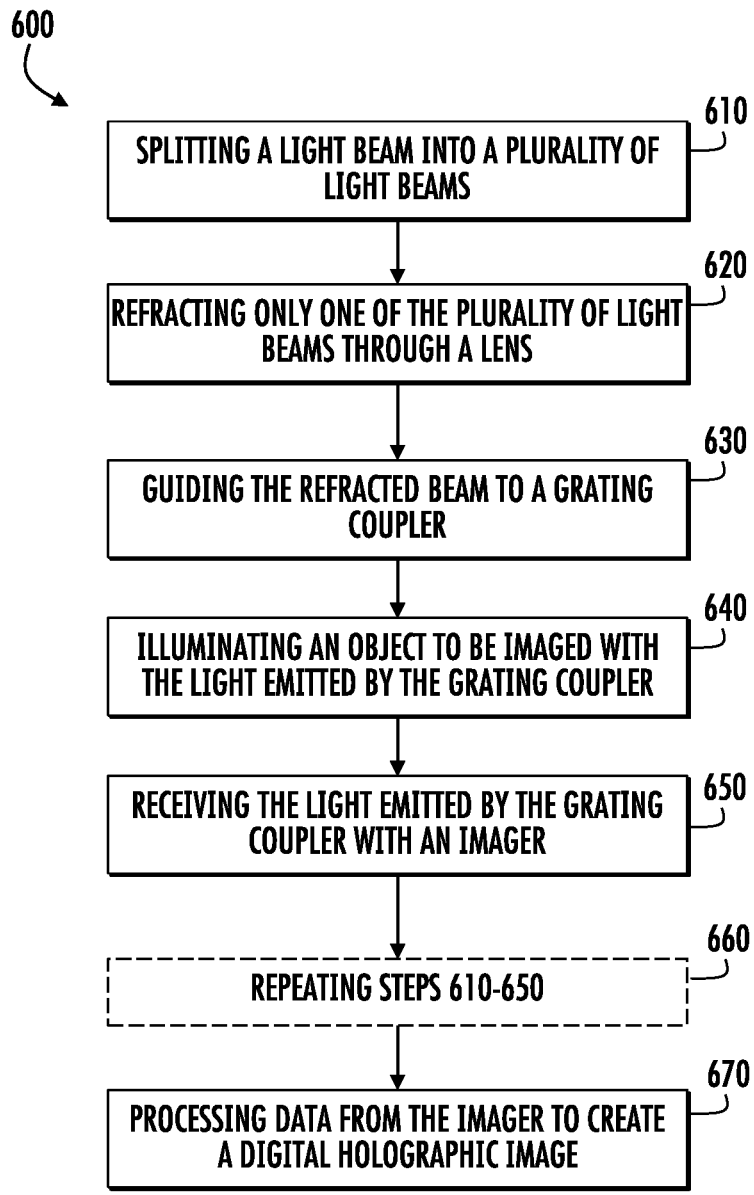

FIG. 6 provides a method of creating a digital holographic image.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the term "optically coupled" means that the combination of optical components allows light to be transferred either directly or indirectly between the optical components.

As used herein, the terms "coupled," "fixed," "attached to," and the like refer to both direct coupling, fixing, or attaching, as well as indirect coupling, fixing, or attaching through one or more intermediate components or features, unless otherwise specified herein.

Referring now to FIG. 1, a perspective view of an imaging device 100 is provided, in accordance with an example embodiment. In various examples, the imaging device 100 is a digital holographic microscope, such as an inline digital holographic microscope, an off-axis digital holographic microscope, etc. As will be explained further, the imaging device 100 can include a light source 110 (FIG. 2 and FIG. 4), a photonic integrated circuit 200 (FIG. 2 and FIG. 4), and an imager 700 (FIG. 3).

The light source 110 can be a laser, such as a wavelength sweeping laser, a wavelength tuning laser, or a diode laser. The light source 110 can be coupled, mechanically and/or optically, to the photonic integrated circuit 200 or it can be integral with the photonic integrated circuit 200. As will be discussed further, the photonic integrated circuit 200 can be configured to receive the light emitted from the light source 110 to illuminate an object 10 to be imaged, such as a biological sample, such as pollen, white blood cells, red blood cells, cancer cells, or fibroblast cells.

The light source 110 can be configured such that a wavelength of the light emitted from the light source 110 can be tuned. As will be appreciated, different objects 10 to be imaged may require a different wavelength of light to produce a clear image. For example, larger objects 10, such as pollen, may require a greater wavelength than smaller objects 10, such as red blood cells. In various examples, it may be desirable to tune the light source 110 to emit light at approximately 850 nanometer when imaging pollen, whereas it may be desirable to tune the light source 110 to emit light at approximately 450 nm when imaging red blood cells. Configuring the light source 110 to have a tunable wavelength may result in clearer images for a variety of objects, which can each have different sizes.

The imager 700 can be or include an image sensor, such as a charge-coupled device (CCD) sensor or a complementary metal oxide semiconductor (CMOS) sensor. The imager 700 can be configured to convert photons into electron charges. For example, the imager 700 that includes a CCD sensor can include an array of capacitors that can be configured to carry an electric charge that corresponds to the light intensity of each pixel. As another example, the imager 700 that includes a CMOS sensor can include an array of light-sensitive diodes that convert photons into electron charges.

In operation, the object 10 to be imaged can be positioned between the photonic integrated circuit 200 and the imager 700. As will be discussed further, the photonic integrated circuit 200 can be configured to illuminate the object 10 to be imaged at one or more angles respective to a plane defined by a surface 205 of the photonic integrated circuit 200. For example, the imaging device 100 can be configured to operate in a first mode and in a second mode. In the first mode, the photonic integrated circuit 200 may illuminate the object 10 to be imaged at a singular angle and the imager 700 can receive the photons emitted from the photonic integrated circuit 200 at the singular angle. In the second mode, the photonic integrated circuit 200 may illuminate the object 10 to be imaged at a plurality of different angles and the imager 700 can receive the photons emitted from the photonic integrated circuit 200 from the plurality of different angles. In various examples, when the imaging device 100 is operating in the second mode, the photonic integrated circuit 200 may illuminate the object 10 to be imaged at a plurality of different angles sequentially. For example, the photonic integrated circuit 200 may be configured to emit light at a first angle, followed by emitting light at a second angle, followed by emitting light at a third angle, and so forth. Similarly, when the imaging device 100 is operating in the second mode, the imager 700 can be configured to sequentially receive the photons emitted by the photonic integrated circuit 200 at the plurality of different angles. As will be appreciated, operating the imaging device 100 in the second mode may result in a higher resolution image than operating the imaging device 100 in the first mode. For example, operating the imaging device 100 in the second mode may result in a resolution of a captured image that is at least 5 percent greater, such as at least 20 percent greater, such as at least 50 percent greater than a resolution of a captured image when the imaging device 100 is operating in the first mode.

In various examples, the imaging device 100 can operate in more than just a first mode and a second mode. For example, the imaging device can be configured to operate in any number of modes, such as in a first mode, a second mode, a third mode, a fourth mode, etc. As discussed, in the first mode, the photonic integrated circuit 200 may illuminate the object 10 to be imaged at a singular angle and the imager 700 can receive the photons emitted from the photonic integrated circuit 200 at the singular angle. In the second mode, the photonic integrated circuit 200 may illuminate the object 10 to be imaged at multiple angles and the imager 700 can receive the photons emitted from the photonic integrated circuit 200 at the multiple angles. The imaging device 100 can be further configured to operate in a third mode that can illuminate the object 10 to be imaged at more angles than when the imaging device is operating in the second mode and the imager 700 can receive the photons emitted from the photonic integrated circuit 200 at more angles than when the imaging device is operating in the second mode. Similarly, in the fourth, fifth, sixth, etc. mode, the imaging device 100 can illuminate the object 10 at even more angles and the imager 100 can receive the photons emitted at those angles, as compared to when the imaging device 100 is operating in the first, second, or third modes.

The imaging device 100 may be configured to switch from each of the plurality of modes (first, second, third, fourth, etc. modes). For example, the imaging device 100 can be configured to switch from the first mode to the second mode, and vice-versa. For example, the imaging device can include a physical switch or knob on a housing of the imaging device 100 that a user can manipulate to switch the imaging device 100 from the first mode to the second mode, and vice-versa. In various examples, a user can adjust the mode of the imaging device 100 via an electrical device that is in communication with the imaging device. For example, a user can adjust the mode of the imaging device with the use of a computer or mobile electronic device that is configured to send electrical signals to the imaging device 100.

Referring now to FIG. 2, a schematic, top view of a photonic integrated circuit 200 is provided, in accordance with an example embodiment. As discussed, the light source 110 can be coupled, mechanically and/or optically, to the photonic integrated circuit 200 or it can be integral with the photonic integrated circuit 200. The photonic integrated circuit 200 can have a surface 205 that defines a plane (extending along the surface of the paper). The photonic integrated circuit 200 can include a branching waveguide 210, such as an optical fiber waveguide, which is optically coupled to the light source 110. The branching waveguide 210 can include a plurality of branches 211 and the branching waveguide 210 can be configured to split the beam of light emitted by the light source 110 into the branches 211 of the branching waveguide 210. For example, the branching waveguide 210 can be configured to split the beam of light emitted by the light source 110 into two separate branches 211, each of which is subsequently split into two additional branches 211, and so forth. As will be appreciated, the branching waveguide 210 can be configured to split the beam of light emitted by the light source 110 into ultimately a plurality of terminal branches 211', such as at least four, such as at least eight, such as at least sixteen, such as at least thirty-two terminal branches 211' of the branching waveguide 210. As used herein, the term "terminal branch" refers to a branch 211 of the branching waveguide 210 that is situated at the end or extremity of the branching waveguide 210 on the opposite side from which the light source 110 is situated.

The photonic integrated circuit 200 can include a multi-angle illumination device 220. The multi-angle illumination device 220 can define an axis A that extends orthogonal to the plane that is defined by the surface 205 of the photonic integrated circuit 200 (i.e., orthogonal to the page). In various examples, and as depicted, the multi-angle illumination device 220 is, or includes, an optical phased array 230. The optical phased array 230 can include a plurality of light emitters 231 that are each configured to emit light. In various examples, each of the light emitters 231 can be optically coupled to a different terminal branch of the branching waveguide 210. As such, light may travel from the light source 110, through the branching waveguide 210, and to the light emitters 231 of the optical phased array 230.

In various examples, and as depicted, the multi-angle illumination device 220 includes a plurality of light emitters 231 that collectively form a two-dimensional shape. For example, the plurality of light emitters 231 can extend circumferentially around the axis A to form a circular shape. However, in various other examples, the plurality of light emitters 231 collectively form other shapes other than a circle, such as a triangle, an oval, or a square. The multi-angle illumination device 220 can include any number of light emitters 231, such as two, four, eight, sixteen, or thirty-two light emitters 231.

The photonic-integrated circuit can include a phase modulator 300. The phase modulator 300 can include a plurality of electrodes that can be electrically associated with (e.g., coupled to) the branches 211 of the branching waveguide 210. In various examples, the phase modulator 300 is configured as a lithium niobate electro-optic modulator. As will be appreciated, electrical voltage can be applied to the electrodes of the phase modulator 300, which can create an electrical field. The electrical field created by the electrodes can change or shift the phase of the light that is traveling through at least one of the branches 211 of the branching waveguide 210 via the electro-optic effect.

In various examples, the phase modulator 300 can be configured as thermo-optic phase shifter. For example, the phase modulator 300 can include a plurality of heaters that are each associated with a branch 211 of the branching waveguide 210. Each of the heaters can be coupled, directly or indirectly through wires, to one or more heater wire pads. The heater wire pads can increase a temperature of each of the heaters, which causes a temperature of the corresponding branch 211 of the branching waveguide 210 to increase. As will be appreciated, the change in the temperature of at least one branch 211 of the branching waveguide 210 will change the refractive index of the at least one branch 211 through the thermo-optic effect. This, in turn, changes the phase of the light traveling through the at least one branch 211.

In various examples, the phase modulator 300 can be configured so that a phase of light that is traveling through one or more of the terminal branches 211' of the branching waveguide 210 is different than a phase of light that is traveling through at least another one of the terminal branches 211' of the branching waveguide 210. Because each of the light emitters 231 can be optically coupled to a different terminal branch of the branching waveguide 210, the phase of the light that is emitted by at least one of the light emitters 231 can be different than a phase of light that is emitted by at least another one of the light emitters 231. In various examples, the phase of the light that is emitted by each of the light emitters 231 is different than the phase of light that is emitted by all of the other light emitters 231.

In various examples, light can be emitted by each of the light emitters 231 of the multi-angle illumination device 220 simultaneously and can combine to create a superposed light beam. The photonic integrated circuit 200 can be configured to adjust an angle of the superposed light beam emitted by the multi-angle illumination device 220 relative to the axis A. For example, and as discussed, the phase of the light that is emitted by at least one of the light emitters 231 can be different than a phase of light that is emitted by at least another one of the light emitters 231. As will be appreciated, adjusting the phase of the light that is emitted by at least one of the light emitters 231 such that it is different than a phase of light that is emitted by at least another one of the light emitters 231 causes a change in the angle of the resulting superposed light beam relative to the axis A. Because the light emitters 231 collectively form a two-dimensional shape, the angle of the superposed light beam can be steered in two dimensions by adjusting the phase of the light emitted by at least one of the light emitters 231. Multiple illumination angles can be accomplished with the photonic integrated circuit 200 by sequentially adjusting the phase of the light through at least one of the terminal branches 211' of the branching waveguide 210 by the phase modulator 300.

Notably, no physical movement of components of the imaging device 100, such as the use of a mechanical device that moves a lens, is required to adjust the angle of the superposed light beam that is emitted by the multi-angle illumination device 220. Instead, the angle of the superposed light beam is adjusted by controlling the amount of voltage applied to one or more electrode of the phase modulator 300. This has various benefits, such as reducing the complexity of the imaging device 100, which may reduce the cost of manufacturing the imaging device 100.

Referring now to FIG. 3, a schematic, perspective view of a portion of the imaging device 100 with the multi-angle illumination device 220 of FIG. 2 is provided, in accordance with an example embodiment. In operation, and as discussed, the imaging device 100 can be configured to operate in a first mode and in a second mode. In the first mode, the photonic integrated circuit 200 may illuminate the object 10 to be imaged with the superposed light beam that is emitted at a singular angle $\Theta$. As a portion of the superposed light beam travels through the object 10 to be imaged, the light is slowed, which shifts the phase of the light relative to the portion of the superposed light beam that does not travel through the object 10 to be imaged. This relative change of the phase of the light that travels through the object 10 to be imaged is sensed by the imager 700 and subsequently processed by, for example, reconstruction algorithms, to create a digital image of the object 10. In the second mode, the photonic integrated circuit 200 may illuminate the object 10 to be imaged with the superposed light beam that is sequentially emitted at a plurality of different angles $\Theta$. For each angle, the relative change of the phase of the light that travels through the object 10 is sensed by the imager 700. The data collected by the imager 700 for each angle $\Theta$ of the superposed light beam is subsequently processed by, for example, reconstruction algorithms, to create a digital image of the object 10. As will be appreciated, the resolution of the digital image of the object 10 can be increased by increasing the number of different angles of the superposed light beam used to sequentially image the object 10.

Referring now to FIG. 4, a schematic, top view of a photonic integrated circuit 200 is provided, in accordance with an example embodiment. Similar to the photonic integrated circuit 200 of FIG. 3, the photonic integrate circuit of FIG. 4 can include a light source 110 and a branching waveguide 210 that is optically coupled to the light source 110. In various examples, and as depicted in FIG. 4, the multi-angle illumination device 220 includes or is configured as a grating coupler 250. The grating coupler 250 can include a plurality of trenches 251 that are etched on the grating coupler 250. The trenches 251 can form a plurality of teeth 252. The multi-angle illumination device 220 can include a slab 240 that has a lens 241, such as a planar lens.

The photonic integrated circuit 200 can include a light switching network 400. The light switching network 400 can be configured to allow light to travel through one of the terminal branches 211' of the branching waveguide 210 and into the slab 240 while preventing light from traveling through the other of the terminal branches 211' of the branching waveguide 210 and into the slab 240. Once light travels through one of the terminal branches 211', the light travels through the lens 241 of the slab 240. The lens 241 of the slab 240 can be configured to refract the light that travels out of the selected terminal branch. For example, the lens 241 can define a longitudinal centerline CL and can have an arc shape. When light travels through a terminal branch that is furthest away from the centerline CL, the angle of the light emitted by the terminal branch can be bent inward at an angle towards the centerline CL as it travels through the lens 241. As will be appreciated, when light travels through a terminal branch that is closer to the centerline CL, the angle of the light bent by the lens 241 is reduced. As such, the angle of light emitted by the lens 241 of the slab 240 can be adjusted by selecting which terminal branch of the branching waveguide 210 that light is emitted from. Once light is emitted by the lens 241, the light travels to the grating coupler 250. The grating coupler 250 can be configured to subsequently direct the light at least partially in a direction orthogonal to the plane defined by the surface 205 of the photonic integrated circuit 200.

The photonic integrated circuit 200 can be configured to sequentially emit light from the grating coupler 250 at different angles. For example, the light switching network 400 can allow light to pass through a first terminal branch of the branching waveguide 210, followed by allowing light to pass through a second terminal branch of the branching waveguide 210, followed by allowing light to pass through a third terminal branch of the branching waveguide 210, and so forth. Depending on the location of the terminal branch emitting light at a particular time relative to the center line CL, the angle of the light emitted by the grating coupler 250 is changed.

In operation, and as discussed, the imaging device 100 can be configured to operate in a first mode and in a second mode. In the first mode, the photonic integrated circuit 200 may illuminate the object 10 to be imaged with the light emitted by the grating coupler 250 that is received from one of the terminal branches 211' of the branching guide wave. As a portion of the light travels through the object 10 to be imaged, the light is slowed, which changes the phase of the light relative to the portion of the light that does not travel through the object 10 to be imaged. This relative change of the phase of the light that travels through the object 10 is sensed by the imager 700 and subsequently processed by, for example, reconstruction algorithms, to create a digital image of the object 10. In the second mode, the photonic integrated circuit 200 may illuminate the object 10 to be imaged at different angles, sequentially, by selecting different terminal branches 211' from which light is emitted with the light switching network 400. For each angle, the relative change of the phase of the light that travels through the object 10 is sensed by the imager 700. The data collected by the imager 700 for each angle of the light is subsequently processed by, for example, reconstruction algorithms, to create a digital image of the object 10. As will be appreciated, the resolution of the digital image of the object 10 can be increased by increasing the number of different angles of the light used to sequentially image the object 10.

Referring now to FIG. 5, a method 500 of creating a digital holographic image is provided, in accordance with an example embodiment. The method 500 can include a step 510 of splitting a light beam into a plurality of light beams. For example, a branching waveguide 210 can be used to split the light beam into the plurality of light beams. The method 500 can include a step 520 of shifting a phase of at least one of the plurality of light beams. For example, a phase modulator 300 can be used to adjust a phase of one or more of the plurality of light beams. The method 500 can include a step 530 of combining the plurality of light beams to create a superposed light beam. For example, each of the plurality of light beams can travel to a different light emitter, such as a light emitter for an optical phased array 230. Each of the light emitters 231 can be positioned proximate to each other. As such, when the light is emitted from the light emitters 231, they may combine to create a superposed light beam. The method 500 can include a step 540 of illuminating an object 10 to be imaged with the superposed light beam. The method 500 can include a step 550 of receiving the superposed light beam with an imager 700. When the imaging device 100 is operating in the second mode, the method 500 can include a step 560 of repeating the steps 510-550 at least once, but adjusting a phase of at least one of the plurality of light beams differently to adjust an angle of the superposed light beam. As will be appreciated, steps 510-550 can be repeated any number of times, such as two, four, eight, sixteen, thirty two or more times to increasingly improve the resolution of the image to be captured. When the imaging device 100 is operating in the first mode, the method 500 may not include step 560. The method 500 can include a step 570 of processing data from the imager 700 to create a digital holographic image.

Referring now to FIG. 6, a method 600 of creating a digital holographic image is provided, in accordance with an example embodiment. The method 600 can include a step 610 of splitting a light beam into a plurality of light beams. For example, a branching waveguide 210 can be used to split the light beam into the plurality of light beams. The method 600 can include a step 620 of refracting one of the plurality of light beams through a lens 241. The method 600 can include a step 630 of guiding the refracted beam to a grating coupler 250. The method 600 can include a step 640 of illuminating an object 10 to be imaged with the light emitted by the grating coupler 250. The method 600 can include a step 650 of receiving the light emitted by the grating coupler 250 with an imager 700. When the imaging device 100 is operating in the second mode, the method 600 can include a step 660 of repeating the steps 610-650, but refracting a different one of the plurality of light beams through the lens 241. As will be appreciated, steps 610-650 can be repeated any number of times, such as two, four, eight, sixteen, thirty two or more times to increasingly improve the resolution of the image to be captured. When the imaging device 100 is operating in the first mode, the method 600 may not include step 660. The method 600 can include a step 670 of processing data from the imager 700 to create a digital holographic image.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A digital holographic microscope comprising:
a light source; and
a photonic integrated circuit comprising:
   a branching waveguide optically coupled to the light source; and
   a multi-angle illumination device optically coupled to the branching waveguide.

2. The digital holographic microscope of claim 1, wherein the multi-angle illumination device comprises an optical phased array comprising a plurality of light emitters.

3. The digital holographic microscope of claim 2, wherein the branching waveguide comprises a plurality of terminal branches that are each optically coupled to a corresponding light emitter of the plurality of light emitters.

4. The digital holographic microscope of claim 1, wherein the photonic integrated circuit comprises a phase modulator, wherein the phase modulator is configured to change a phase of light passing through the branching waveguide.

5. The digital holographic microscope of claim 4, wherein the phase modulator is configured to change an angle of a superposed light beam emitted from the multi-angle illumination device.

6. The digital holographic microscope of claim 1, wherein the light source is a wavelength sweeping laser or a wavelength tuning laser.

7. The digital holographic microscope of claim 1, wherein the light source is configured to emit light at a plurality of different wavelengths.

8. The digital holographic microscope of claim 1, further comprising an imager.

9. The digital holographic microscope of claim 8, wherein the imager is a charge-coupled device (CCD) sensor.

10. The digital holographic microscope of claim 1, wherein the multi-angle illumination device comprises a grating coupler.

11. The digital holographic microscope of claim 10, wherein the multi-angle illumination device comprises a planar lens.

12. The digital holographic microscope of claim 1, wherein the branching waveguide comprises a plurality of terminal branches, and wherein the photonic integrated circuit comprises a light switching network configured to prevent light from passing through at least one of the plurality of terminal branches.

13. The digital holographic microscope of claim 1, wherein the digital holographic microscope is configured to operate in a first mode and in a second mode,
wherein when the digital holographic microscope is operating in the first mode, the multi-angle illumination device illuminates an object to be imaged at a first number of angles,
wherein when the digital holographic microscope is operating in the second mode, the multi-angle illumination device illuminates an object to be imaged at a second number of angles, and
wherein the second number of angles is greater than the first number of angles.

14. A method of creating a digital holographic image, the method comprising:
(i) splitting a light beam into a plurality of light beams;
(ii) shifting a phase of at least one of the plurality of light beams;
(iii) combining the plurality of light beams to create a superposed light beam;
(iv) illuminating an object to be imaged with the superposed light beam; and
(v) receiving the superposed light beam with an imager.

15. The method of claim 14, further comprising repeating steps (i) through (v) at least one time.

16. The method of claim 14, further comprising repeating steps (i) through (v) at least four times.

17. The method of claim 14, further comprising processing data from the imager to create the digital holographic image.

18. A method of creating a digital holographic image, the method comprising:
(i) splitting a light beam into a plurality of light beams;
(ii) refracting only one of the plurality of light beams through a lens;
(iii) guiding the refracted beam to a grating coupler,
(iv) illuminating an object to be imaged with the light emitted by the grating coupler; and
(v) receiving the light emitted by the grating coupler with an imager.

19. The method of claim 18, further comprising repeating steps (i) through (v) at least one time.

20. The method of claim 18, further comprising repeating steps (i) through (v) at least four times.

* * * * *